July 1, 1958
F. W. SCHWARZ
2,840,972
LAWN SWEEPER AND MATERIAL DISINTEGRATOR
Filed Nov. 15, 1955
2 Sheets-Sheet 2
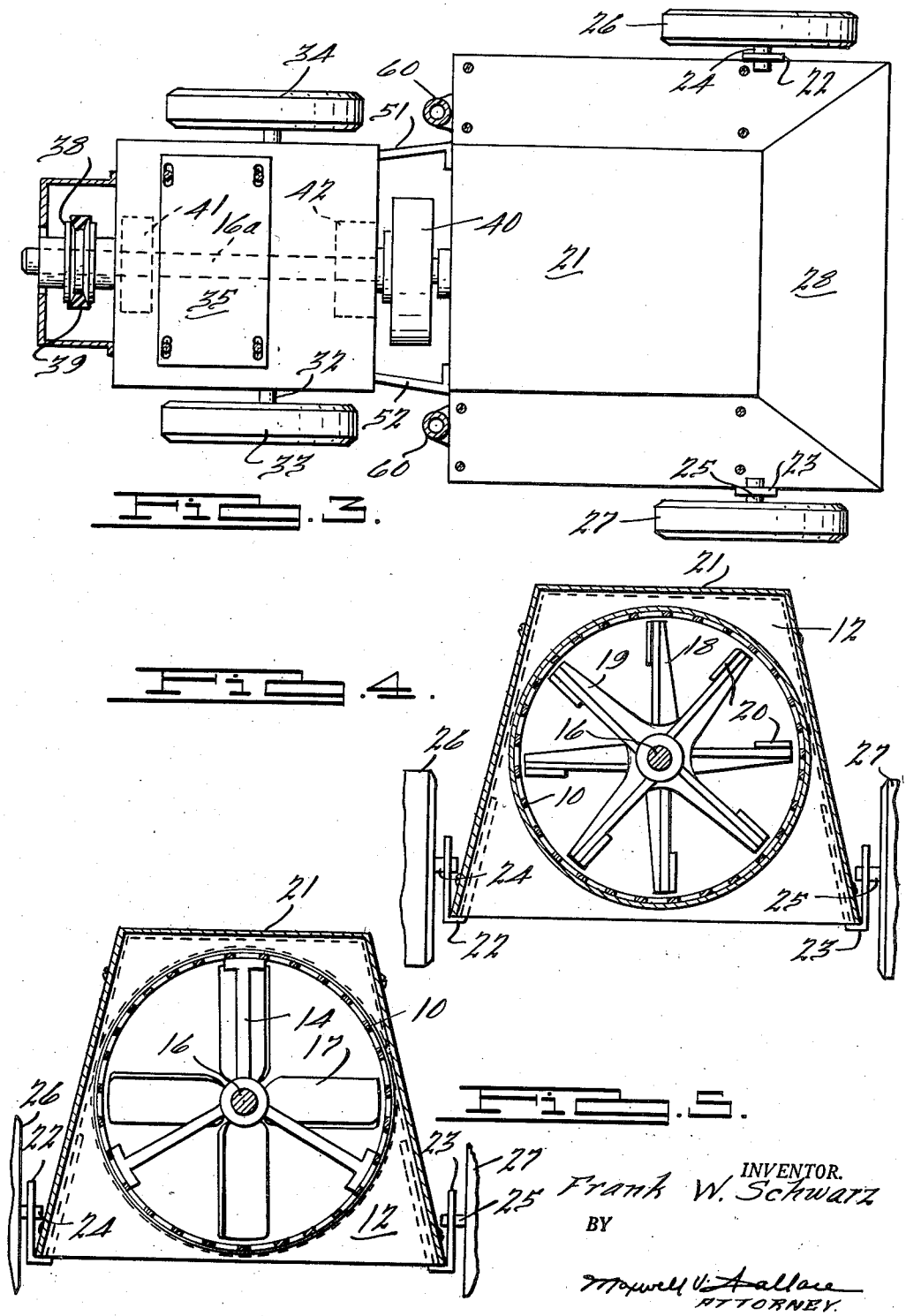
INVENTOR.
Frank W. Schwarz
BY
Maxwell V. Wallace
ATTORNEY.

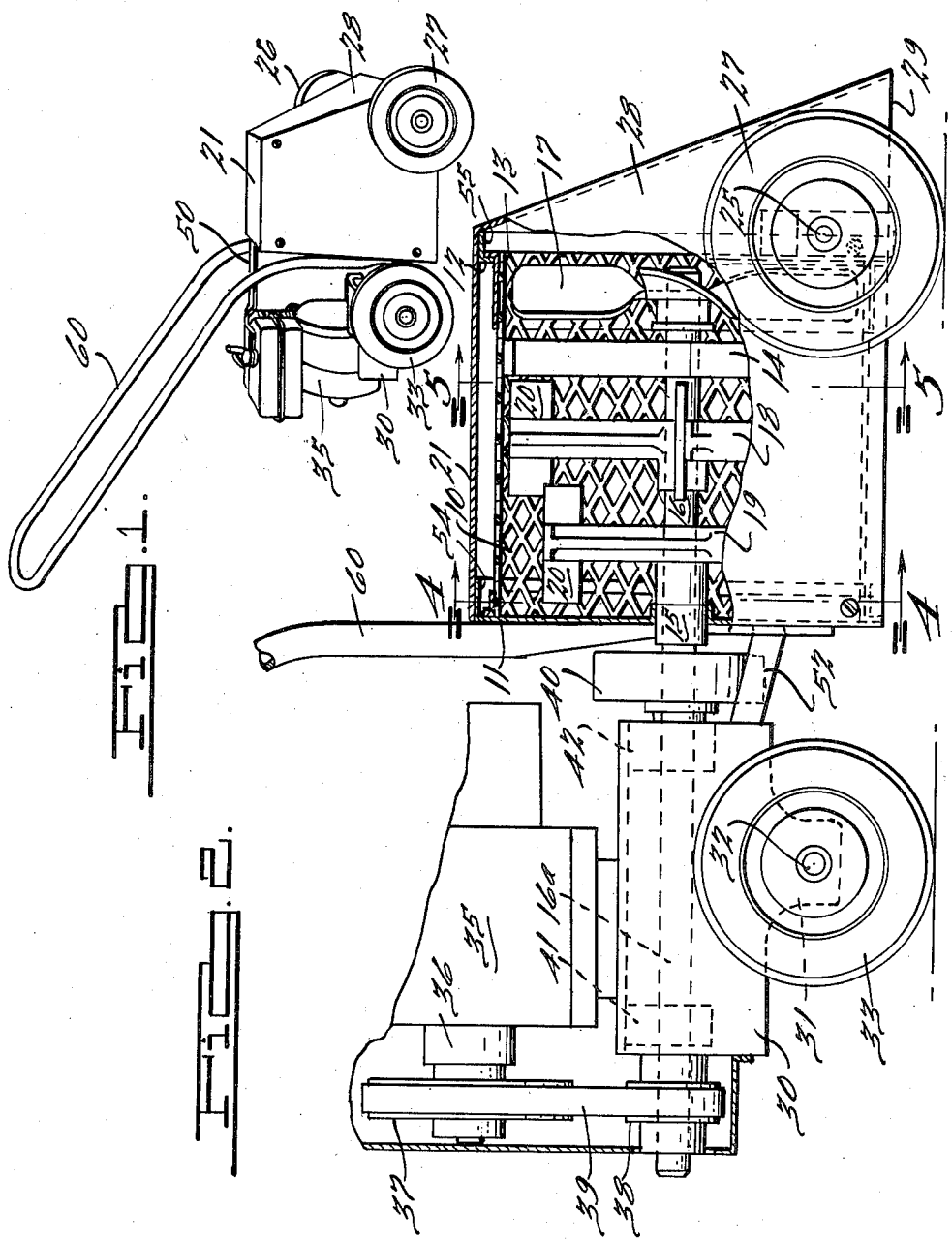

United States Patent Office 2,840,972
Patented July 1, 1958

2,840,972

LAWN SWEEPER AND MATERIAL DISINTEGRATOR

Frank W. Schwarz, Berkley, Mich.

Application November 15, 1955, Serial No. 546,884

4 Claims. (Cl. 55—118)

This invention relates to a new and improved device for gathering leaves, mown grass, twigs, sticks, etc., that collect on lawns or surface areas, grinding and disintegrating the gathered material, and then distributing the finely reduced product back upon the cleared surface as a fertilizing mulch.

In my patent No. 2,677,223, issued May 4, 1954, I disclosed a lawn sweeper and material disintegrator wherein a mobile horizontally disposed cylinder formed a body member having a nozzle member at one end thereof provided with a downwardly directed inlet opening and a discharge nozzle member at the other end of the cylindrical body member provided with a downwardly directed outlet opening, wherein the material to be mulched was sucked into the nozzle located at the front end of the cylinder, disintegrated by chopping means within the cylinder, and the finely reduced product distributed upon the cleared surface through the discharge nozzle at the rear of the sweeper.

Although this device has worked satisfactorily, an even more satisfactory result is produced by the instant disclosure wherein the gathered material is taken into an expanded metal drum, disintegrated and immediately distributed upon the cleared surface from the entire expanded metal drum.

The above and other features will be seen from the following more detailed description, and from the drawing, wherein:

Fig. 1 is a perspective view of the device.

Fig. 2 is a side elevation with the parts broken away to show the mulching mechanism.

Fig. 3 is a top plan view of the leaf mulcher.

Fig. 4 is a section taken substantially along line 4—4 of Fig. 2; and

Fig. 5 is a section taken substantially along line 5—5 of Fig. 2.

Referring now to the drawings, the device is what might be termed a builtup structure of light gauge sheet steel, or the like, wherein a housing carrying the front wheels of the device, acts as a cover for the disintegrator or crushing chamber, and wherein the platform carrying the power unit also supports the crushing chamber, so that when the hood or housing member is secured to the crusher chamber frame, there is formed a complete unit ready for use.

A crushing chamber 10, the same being formed as a tube of expanded metal, is provided, said tube being welded to a pair of opposed plate members 11, 12, plate 12 having an opening 13 therein to allow the passage of leaves, etc., therethrough into the crushing chamber 10, and such plate members 11, 12 having flanges formed thereon 54, 55, for a purpose later to be described. A spider member 14, Figs. 2 and 5, is provided, the same being mounted within chamber 10, as by welding, or bolts, to provide a three point suspension bearing member. Another bearing member 15 is secured within rear plate 11, said bearing members 14, 15 being adapted to support and journal a power shaft 16. On the forward end of shaft 16, adjacent and in line with opening 13 in plate 12, a fan, 17 is suitably mounted and secured, as with a set screw, and immediately back of spider bearing 14 are mounted on shaft 16, a pair of crusher blades, 18, 19, the same being spaced apart and secured by means of set screws, each blade having secured near its outer end a beater pad 20, the same comprising a flat steel plate, said pads, as shown best in Fig. 2 of the drawings, partially overlapping and the blades of the crushers are mounted so that no two of the blades are in longitudinal alignment.

To enclose crusher chamber 10 there is provided a metal hood or housing member 21, the same being shaped, as shown best in Fig. 3. A pair of opposed wheel brackets 22, 23, are provided, the same being secured to the lower front leading edge of housing 21 and forming journal supports for wheel axles 24, 25, of front wheels 26, 27. The front portion of housing 21 is flared, as at 28, Figs. 2 and 3, to provide the front portion of a nozzle 29, the other portion of said nozzle being formed by plate 12. Housing 21 fits over crushing chamber 10 and seats on top of plate flange 55 formed on plate 12, and plate flange 54 formed on plate 11, Fig. 2, and can be quickly fastened in place by means of screws, or the like. When the four sided housing is in place it will be seen from Figs. 2, 4 and 5 that there is adequate space between the inside of the housing and the crushing chamber to allow discharged material to pass therebetween. A detachable pusher handle 60 is provided, the same being conveniently secured to the back of plate member 11.

A power unit is provided, the same being separated from, but secured to the crushing unit by means of brackets 50, 51 and 52, brackets 51 and 52 holding plate 11 rigid with power base 30 and bracket 50 being an additional support holding the gas tank unit of the power unit to the upper portion of plate 11. Base 30 has a portion of the sides thereof turned down to form a pair of opposed skirts or brackets 31, adapted to receive axle 32, said axle 32 passing across the top of base 30 to rotatably support a pair of wheels 33, 34. Base 30 has mounted theeron a motor 35 which in turn has a take-off shaft 36 on which is secured a belt pulley 37. Another pulley 39 is provided, the same being adapted to be secured to power shaft 16A by a set screw, or the like, and driven belt 39 is provided to provide a belt run between pulleys 37, 38. To couple the drive shaft 16a and drive shaft 16, there is provided within a suitable housing a conventional centrifugal type clutch 40.

The manner in which the device operates is as follows:

The device is pushed, by means of handle 60 to the place where it is to be used and the motor on the motor unit is started by use of the conventional pull-rope. Although a gasoline type motor is shown in Fig. 1, any type of motor may be used, just so long as the source of power provides sufficient revolutions per minute to create the necessary crushing action and vacuum to thoroughly disintegrate the material being processed. As take-off shaft 36 rotates pulley 37 is also rotated and power is imparted to pulley 38 through belt run 39, and inasmuch as pulley 38 is secured to drive shaft 16a, said drive shaft is rotated and in turn power is transmitted to driven shaft 16 through centrifugal clutch 40. This type of clutch allows slippage so that if some type of foreign matter, such as steel, should get up into the crushing chamber, the clutch allows shaft 16 to stop rotating without causing damage to drive shaft 16a until the motor can be shut off.

Fan 17 and cutter blades 18, 19, are all secured to driven shaft 16 and rotate in unison therewith on account of the same having a horizontal common rotatable power shaft or driven and drive shaft 16a, 16. As the unit is propelled along the ground by means of handle 60, intake nozzle 29, which is open throughout the extent of its bottom and which open bottom is positioned to travel close to the ground surface, allows, leaves, etc., to be sucked therein by means of a draft of air provided by the rotation of fan 17, which in turn draws said material through opening 13 in plate 12 and on into crushing chamber 10 where it immediately comes in contact with the crusher blades 18, 19, which are rotating at the same speed as that of fan 17. Inasmuch as no two of these blades are in longitudinal alignment, the picked-up matter is pulverized by means of the blades and beater pads secured to the ends thereof, said beater pads being slightly overlapped, as shown best in Fig. 2 of the drawings, to beat said material into small particles. All of the matter that has been sufficiently processed passes directly out through the openings in the crushing chamber 10 and is thrown against the inside of housing 21, and, inasmuch as there is space between chamber 10 and the inner surface of housing 21, the disintegrated material falls at once to the ground through the bottom of the housing, which is completely open, and is distributed the entire open area of the bottom of said housing 21. The beater pads facilitate processing more picked up materials in a shorter span of time than was previously possible with my earlier device and the open housing allows for greater area spread of the mulch which is extruded from the crushing chamber than was formerly possible with my earlier model which used an intake and exhaust nozzle and passed the material picked up through an expanded metal lined cylinder.

As shown, the bottom of the housing 21 extends below the bottom of the perforated drum, and the rear end of the drum is closed. Accordingly, the disintegrated material is deposited in a definite path directly below the open bottom of the housing.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. In a combined lawn sweeper and material disintegrator, the combination of a horizontally disposed drum having an open front end, a closed rear end and a foraminous peripheral wall affording discharge openings for disintegrated material, an open bottomed housing mounted on said drum and surrounding the same in spaced relation whereby disintegrated material discharged through said openings may be delivered through the space between the drum and the open bottomed housing to the ground, said housing extending below the bottom of the drum, traveling wheels mounted on said housing, the front end portion of said housing providing a material pick-up nozzle in communication with the open front end of the drum, a rotatable shaft disposed axially in the drum, a suction fan mounted on said shaft adjacent said open front, and chopping blades mounted on said shaft intermediate the suction fan and said closed rear end, and means for rotating said shaft.

2. The combination as defined in claim 1, together with means for removably mounting said housing on said drum, said housing being removable from the drum together with said wheels.

3. In a combined lawn sweeper and material disintegrator, the combination of a vertical front plate having an open front end, an imperforate back plate spaced rearwardly from said front plate, a horizontal drum extending between and secured to the front and back plates concentrically with said inlet opening and having a foraminous peripheral wall affording discharge openings for disintegrated material, a bottomless housing removably mounted on said front and back plates and surrounding said drum in spaced relation whereby material discharged through said discharge openings may be delivered through the space between the drum and said housing to the ground, said housing extending below the bottom of the drum, the front end portion of said housing providing a material pick-up nozzle in communication with the inlet opening in said front plate, traveling wheels provided on said housing and removable therewith from said front and back plates, a rotatable shaft disposed axially in said drum, a suction fan mounted on said shaft adjacent said open front, and chopping blades mounted on said shaft intermediate the suction fan and said closed rear end, a wheeled chassis disposed rearwardly of and secured to said back plate, and a power plant mounted on said chassis and operatively connected to said shaft.

4. The combination as defined in claim 3 wherein said chopping blades are spaced longitudinally on said shaft, together with elongated beater members provided on said blades, the beater members of the respective blades being longitudinally overlapped.

References Cited in the file of this patent

UNITED STATES PATENTS

| | | |
|---|---|---|
| 2,538,643 | Gregory | Jan. 16, 1951 |
| 2,661,584 | Ronning | Dec. 8, 1953 |
| 2,677,223 | Schwarz | May 4, 1954 |
| 2,706,372 | Blydenburgh | Apr. 19, 1955 |